Feb. 15, 1944. B. T. CLARK 2,341,904
PICKER AND METHOD OF MAKING SAME
Filed Nov. 28, 1942 2 Sheets-Sheet 1
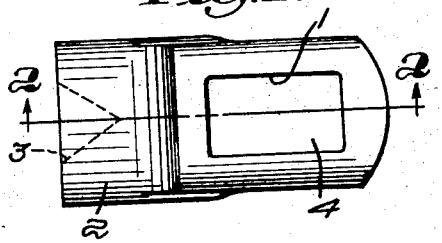
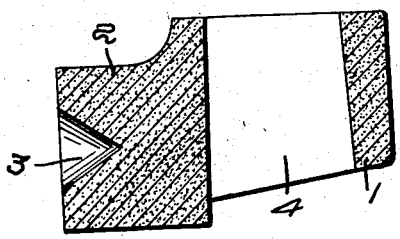
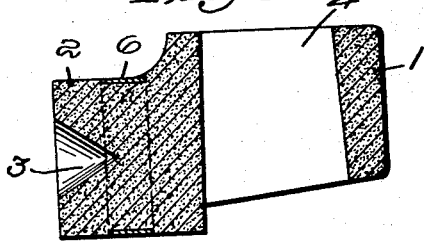
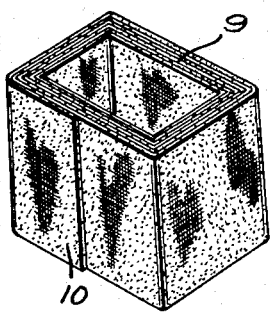
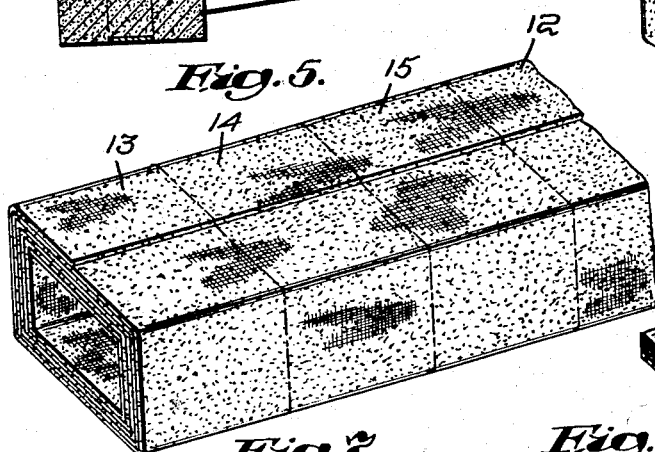
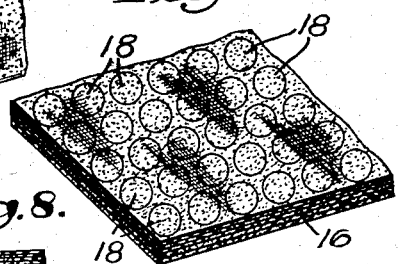
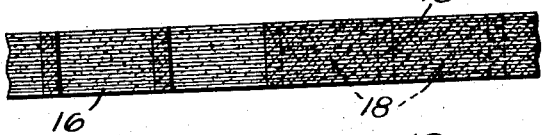
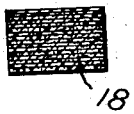
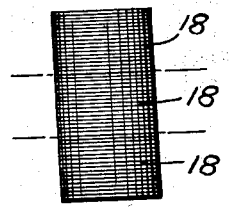
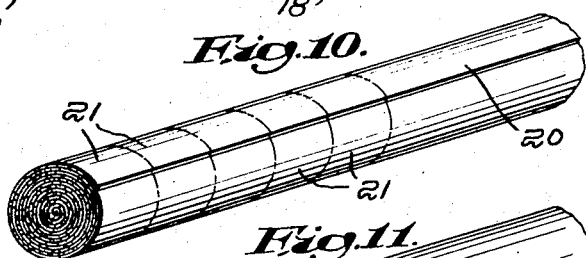
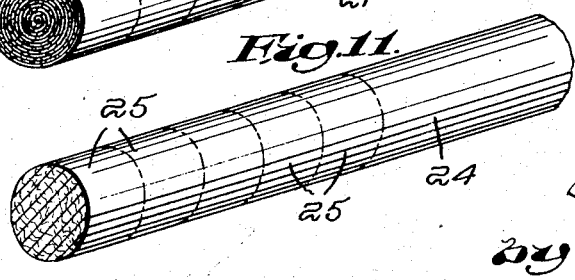
Inventor:
Breckinridge T. Clark
by James L. Hodder
Attorney

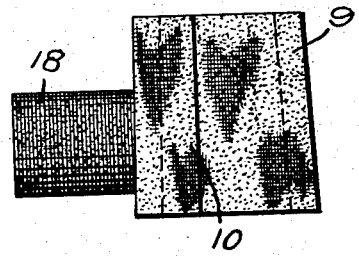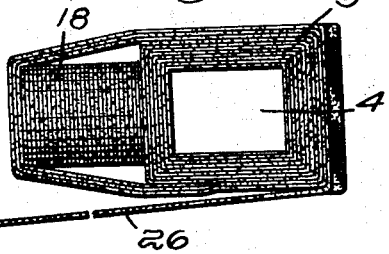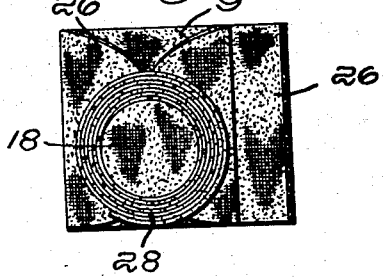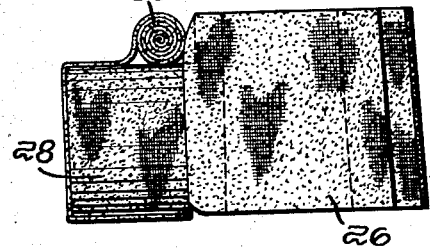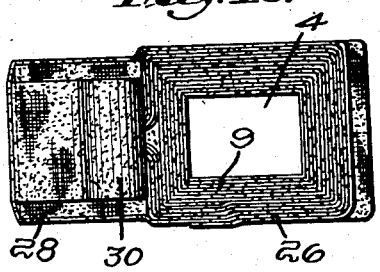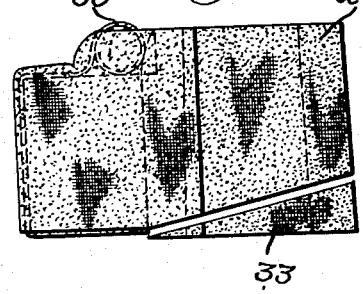

Patented Feb. 15, 1944

2,341,904

UNITED STATES PATENT OFFICE 2,341,904

PICKER AND METHOD OF MAKING SAME

Breckinridge T. Clark, Danielson, Conn., assignor to E. H. Jacobs Mfg. Co., Inc., Danielson, Conn., a corporation of Connecticut Application November 28, 1942, Serial No. 467,219

3 Claims. (Cl. 139—159)

My present invention is a novel and improved picker for use on picker sticks in looms, and includes a novel method of making the same.

Important objects of the present invention are to make a very strong, wear-resistant, and yieldable picker construction, having a plurality of layers of textile material, treated with either a suitable vulcanizable or non-vulcanizable solution, coated or impregnated in said textile material and with particular and special combinations of a plurality of layers, each arranged for most efficient service on the particular part of the picker in which they are incorporated.

In carrying out my present invention, I have discovered that by preparing a suitable textile material treated with a vulcanizable or non-vulcanizable plastic or rubber compound and inter-rolling a plurality of layers of the same around suitable forms, and then molding, compressing, and preferably vulcanizing the same, I obtain an extremely strong and wear-resisting picker construction.

Furthermore, the method I employ in carrying out this invention and the making of a wear-resistant picker of laminated layers is efficient, speedy, and economical and can be readily accomplished without highly skilled labor or special machines.

My novel process consists in first preparing sheets of textile material, such as canvas, with a moldable adhesive, vulcanizable or non-vulcanizable, solution or compound which may be applied as a coating and/or preferably is applied so as to impregnate the entire fibres and thickness of the canvas.

Such a treatment also provides the canvas sheet material with sufficient adhesive qualities to insure a close adherence of superimposed layers of the treated canvas when they are assembled and pressed into moldable form.

My invention comprises the utilization of strips cut from the treated sheet material to form a collar around a mold corresponding to the picker stick on which the resilient picker is to be fitted, superimposing a sufficient number of layers to constitute the collar portion. I also utilize a plug-like member for assembly with such a collar construction, which plug-like member will be the main shuttle-engaging part of this picker.

This plug-like member is preferably round or oval and may be formed from a mass of vulcanizable material but, preferably, I form the same by laying a sufficient number of treated layers superimposed on top of each other and then press the same together and cut from this assembled thickness of material a plug-like section which may be of sufficient length or thickness for the plug portion of the picker, or may comprise two or more plug members in alignment to constitute this part of the picker.

With the collar and plug sections thus prepared, I then assemble the same in proper alignment and thereupon wrap therearound a number of suitable strips of the impregnated canvas which has been cut from the sheet material prepared as above outlined, binding, covering, strengthening, and reinforcing both the collar and plug portions to thus provide a mass of interlaced and inter-rolled canvas-impregnated material into approximately the picker form; thereupon applying the same to a mold, where all are compressed into final form and vulcanized, cured, or solidified in said mold.

Thus I may build the entire picker and plug structure out of sheet material suitably impregnated with vulcanizable or non-vulcanizable compounds, preferably a rubber compound, and the resultant molded, compressed, and usually vulcanizable picker has a plurality of layers of the treated canvas interlaced throughout the picker structure, which gives a maximum of strength and wear-resistance. After molding, the picker may be trimmed. This trimming includes removing the fin or overflow where the molds jam, and a further cutting of the collar portions, as will be explained.

Referring to the drawings illustrating preferred embodiments of my present invention:

Fig. 1 is a plan view of my completed picker construction;

Fig. 2 is a cross-sectional view on the line 2—2 of Fig. 1;

Fig. 3 is a similar cross-sectional view illustrating a reinforcing band around the plug portion;

Fig. 4 is a perspective showing the collar construction;

Fig. 5 is illustrative of the method of making collars of Fig. 4 by forming a long length of wrapped sheet material and then cutting sections for individual collar parts therefrom;

Fig. 6 is a perspective view illustrating the forming of plug sections from a plurality of layers;

Fig. 7 is a cross-sectional view on an enlarged scale of the plurality of layers from which the plugs of Fig. 6 are cut;

Fig. 8 is a cross-sectional view of an individual plug;

Fig. 9 is a side elevational view of assembling a plurality of plugs in alignment to give proper length to the plug structure before assembling with the collar;

Fig. 10 is a modified construction for making plugs, wherein a single sheet of treated canvas is inter-rolled and then individual plugs cut therefrom;

Fig. 11 is a perspective view of a further modification wherein a mass of suitable material is formed as a log and individual plug members cut therefrom;

Fig. 12 is a side view of the step of assembling the prepared collar and prepared plug in alignment;

Fig. 13 is a plan view illustrating the lengthwise wrapping of strips of prepared canvas to hold the plug and collar in assembled position;

Fig. 14 is an end view illustrating the wrapping of the plug sections;

Fig. 15 is a side view illustrating the assembling of a fillet at a desired point between the plug and collar assembled;

Fig. 16 is a plan view of the assembled collar, plug, and fillet, and

Fig. 17 is a side view of the completed picker illustrating the trimming operation. This trimming is usually done before the picker is molded or vulcanized.

As shown in the drawings, my improved picker construction comprises a collar portion designated generally at 1, and a picker stick-engaging portion 2, preferably having molded and formed therein a shuttle-engaging recess 3, the collar being formed with an opening 4 of suitable area and taper to fit upon the picker stick with which the picker is to be assembled in use. I may, if desired, apply a reinforcing metal band or ring 6 around the plug end 2 to strengthen the same, as shown in Fig. 3, such band being applied either before or after the picker has otherwise been completed, molded, and vulcanized.

I first prepare sheets of canvas of suitable strength and grade with a rubber solution, from which to build my improved picker. These sheets may be either cut in strips and then wrapped around a form corresponding to the opening 4 of the completed picker, superimposing or interrolling a sufficient number of layers from the strip material designated at 10, Fig. 4, to constitute the main or basic part 9 of the collar 1, or I may wrap the entire prepared sheet 12 around a suitable form (not shown).

Then with the collar thus formed, I may cut therefrom suitable lengths 13, 14, 15 et seq., as illustrated, thus forming the collar, in which case the form may be appropriately tapered for each section, or the section cut therefrom would have successively different tapers to fit different picker sticks.

The rubber solution is ordinarily sufficient to maintain these layers in assembled position, constituting an adhesive as well as a vulcanizible substance but, if desired, I may also add an adhesive element in the vulcanizable solution to insure the close assembly and sticking together of these layers, bonding the further assembly with the plug end portion and subsequent wrapping, as will be explained.

Various methods may be followed in forming a plug-like section for assembly with the collar section. Thus, as shown in Fig. 6, I may assemble a plurality of layers of treated canvas in superimposed flat position, as indicated at 16, press the same tightly together, and thereupon cut from such an assembled thickness a plurality of plug sections 18.

In Fig. 7 I have shown same on an enlarged scale, wherein the plurality of layers 16 have cut therefrom the individual sections 18 of substantial thickness and suitable area for assembling with the collar 1, which is designed to cooperate therewith.

As shown in Fig. 10, the impregnated sheet material here designated as 20 is interrolled widthwise or lengthwise into a relatively long section, from which individual plugs 21 may be cut.

In Fig. 11 I have illustrated a mass or log 24 of suitable diameter from which individual plug sections 25 may be cut. Other methods of making plug sections for assembly with the collar portion can, of course, be utilized.

In Fig. 12 I have illustrated the preliminary assembly of the collar base portion 9 and a plurality of plug members 18 or 21 or 25, depending upon how the same are prepared; and thereupon I unite the plug and collar sections by a series of lengthwise wrappings of the strip material, as shown at 26, Fig. 13, thus firmly uniting the plug and collar lengthwise. I then apply a plurality of strip wrappings circularly, as shown at 28, around plug sections 18, simultaneously tightening up the lengthwise wrappings 26 around the plug portion, as best shown in Fig. 14.

Preferably I assemble the plug members 18 and collar 9 in a slightly disaligned position, as it is desirable in a resultant picker construction to have a shuttle-engaging portion of the picker as low down on the picker stick as can be possibly arranged with the resultant strength required. Thus, it will be noted in Figs. 2, 3, and 12 that the main plug structure is preferably disaligned; and to strengthen and aid in a smoother molding operation, I add a roll or fillet 30 to the junction between the plug and collar sections where the greatest space is provided, as shown in Fig. 15, which fillet may be also a small mass or rolled strip of vulcanizable treated textile.

One or more final lengthwise wrappings may be applied, if desired, and thereupon the assembled plug, collar, and fillet construction thus prepared is fitted into a suitable mold having a core for the opening 4, wherein the entire mass is compressed into final finished contour, and thereupon vulcanized, resulting in the completed plug construction of Fig. 17, from which a section 33 may be cut, either before or after molding and vulcanizing and thereby resulting in the completed picker construction of Figs. 1 and 2.

During the molding, the shuttle-receiving recess 3 is pressed into the plug or nose portion of the picker and the entire assembly of interlaced textile strips and layers is firmly solidified into a wear-resisting mass of resilient material.

It will be appreciated that my resultant picker construction and the novel, simple, and efficient method of manufactureing the same can be readily carried out with a minimum of skilled labor or machine operations, and that a reinforced resultant picker structure of great wear-resistance and accurate alignment is produced.

I may desire to form the nose portion of a substantially oval construction rather than circular, as this oval structure will enable a greater resistance in some looms than the circular form of shuttle-receiving nose portion. While the drawings show the circular form only, it will be appreciated that any modified circular or oval contour is within the scope of the invention.

I claim:

1. The improved method of making pickers of the kind described, which consists in forming a collar section of moldable material, assembling a plug section therewith, superimposing lengthwise wrappings of adhesively treated strip material around said collar and plug sections, applying a fillet on top of the plug and adjacent said collar, and thereupon compressing, molding, and solidifying the assembled collar, plug, and wrappings thus prepared.

2. The improved method of making pickers of the kind described, which consists in forming a collar section of vulcanizable material, assembling a plug section therewith, superimposing lengthwise wrappings of vulcanizable strip material around said collar and plug sections, applying additional wrappings around the plug portion, adding a fillet on top of said plug adjacent said collar plug, and thereupon compressing, molding, and vulcanizing the wrapped sections thus prepared.

3. As a new article of manufacture, a resilient picker of the kind described, having a combined collar section with a squared opening to fit a picker stick and a rounded plug portion of impregnated textile material, said plug being extended from and united with the collar, together with a fillet on the top portion of the plug and adjacent the collar portions.

BRECKINRIDGE T. CLARK.